United States Patent
Ito et al.

(10) Patent No.: US 6,895,269 B2
(45) Date of Patent: May 17, 2005

(54) DEVICE FOR CONTROLLING EQUIPMENT BY USING SIGNALS FROM A LIVING BODY

(75) Inventors: Yoshitoshi Ito, Ome (JP); Hideaki Koizumi, Tokyo (JP); Atsushi Maki, Hachiojl (JP); Yuichi Yamashita, Kawagoe (JP); Tsuyoshi Yamamoto, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 287 days.

(21) Appl. No.: 09/987,334

(22) Filed: Nov. 14, 2001

(65) Prior Publication Data

US 2002/0028997 A1 Mar. 7, 2002

Related U.S. Application Data

(63) Continuation of application No. 09/385,419, filed on Aug. 30, 1999, now Pat. No. 6,321,110.

(30) Foreign Application Priority Data

Dec. 7, 1998 (JP) .......................................... 10-346450
May 20, 1999 (JP) .......................................... 11-140342

(51) Int. Cl.[7] ................................................. A61B 6/00
(52) U.S. Cl. ....................... 600/476; 600/407; 600/477; 600/473; 600/310; 250/345; 250/341; 356/432
(58) Field of Search ................................. 600/310, 473, 600/476, 477; 356/432, 39, 40, 41, 345; 250/339, 341, 351, 352, 345

(56) References Cited

U.S. PATENT DOCUMENTS

| | | |
|---|---|---|
| 5,158,090 A | 10/1992 | Waldman et al. |
| 5,183,042 A | 2/1993 | Harjunmaa et al. |
| 5,231,464 A | 7/1993 | Ichimura et al. |
| 5,349,961 A | 9/1994 | Stoddart et al. |
| 5,441,054 A | 8/1995 | Tsuchiya |
| 5,470,081 A | 11/1995 | Sato et al. |
| 5,676,142 A | 10/1997 | Miwa et al. |
| 5,694,931 A | 12/1997 | Tsuchiya |
| 5,792,051 A | 8/1998 | Chance |
| 5,803,909 A | 9/1998 | Maki et al. |
| 5,820,558 A | 10/1998 | Chance |
| 5,902,235 A | 5/1999 | Lewis et al. |
| 5,954,053 A | 9/1999 | Chance et al. |
| 5,983,121 A | 11/1999 | Tsuchiya |
| 5,987,351 A | 11/1999 | Chance |
| 6,075,610 A | 6/2000 | Ueda et al. |
| 6,104,946 A | 8/2000 | Tsuchiya et al. |

FOREIGN PATENT DOCUMENTS

| | | |
|---|---|---|
| EP | 99116745 | 8/2002 |
| JP | 62-298114 | 12/1987 |
| JP | 6-296757 | 10/1994 |
| JP | 7-124331 | 5/1995 |
| JP | 9-149894 | 6/1997 |

*Primary Examiner*—Brian L. Casler
*Assistant Examiner*—William C. Jung
(74) *Attorney, Agent, or Firm*—Antonelli, Terry, Stout & Kraus, LLP

(57) ABSTRACT

A device for controlling equipment includes at least one light projector adapted to project light onto a head of a living body. A light collecting section for collecting the light having passed through the head, a light measuring section for measuring an intensity of the light collected by the light collecting section, a memory section for storing a previous history of changes of the intensity of the light measured, a signal judging section for judging if both the intensity of the light measured by said light measuring section and the previous history of changes of the intensity of the light satisfy a predetermined condition, a displaying section for displaying the intensity of the light measured and a result obtained by the signal judging section, and a control signal generating section for generating a control signal for external equipment.

4 Claims, 12 Drawing Sheets

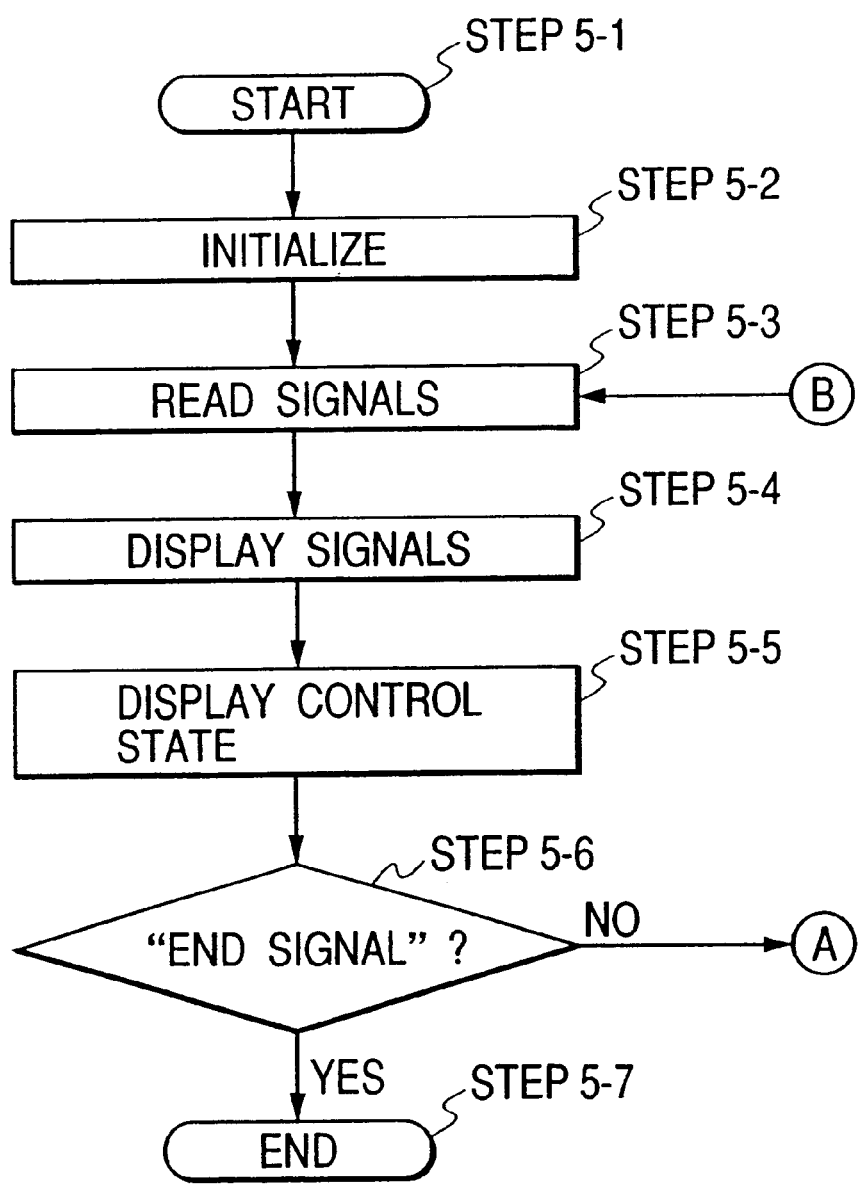

DEVICE FOR CONTROLLING EQUIPMENT BY USING SIGNALS FROM A LIVING BODY

CROSS REFERENCE TO RELATED APPLICATION

This is a continuation of U.S. application Ser. No. 09/385,419, filed Aug. 30, 1999, now U.S. Pat. No. 6,321,110, the subject matter of which is incorporated by reference herein.

BACKGROUND OF THE INVENTION

The present invention relates to a device for controlling equipment by detecting signals reflecting a brain function of a living body by using visible or near-infrared rays and for controlling the equipment by the signals, and in particular to an improvement on the accuracy of the controlling device.

For operation of game machines or computers there have been used input devices provided with a joy stick, a handle or a keyboard operated by muscles in accordance with the command from the brain of a living body.

On the other hand, methods of inputting commands into game machines by using brain waves have been disclosed by Japanese Patent Application Laid-Open Hei 6-296757 and Japanese Patent Application Laid-Open Hei 7-124331. But there is a problem with the methods of inputting commands into game machines by using brain waves that they handle very small electrical currents, and they are easily influenced by electrical noise signal occurring when muscles are moved, or other external noises.

To solve this problem, Japanese Patent Application Laid-Open Hei 9-149894 discloses a method of optically measuring the change of the flow of blood in the brain reflecting the activity of the brain, and using the obtained information on the degree of the brain activation for the purpose of inputting commands into various kinds of equipment.

When a keyboard or a handle is used for operating a game machine or a computer or inputting data into the game machine or the computer, it is easy to confirm the movement of the body for inputting the command to equipment, or to confirm if the data or the control data has been input into the equipment as intended. Therefore, if the data or the control data was not input into the equipment as intended, they can be corrected immediately.

On the other hand, the information on the degree of the brain activation is used for inputting data or as controlling signals, and it was difficult to confirm immediately if the data or the control data has been input into the equipment as intended. The prior art device is not configured such that change in the degree of the brain activation was not perceived by the possessor of the brain.

When light was used to extract characteristics of the brain as signals, it was difficult to separate the intended signals from the other signals because the source for the intended signals are surrounded by some structures or organs of the living body, and consequently the obtained signals could not be used directly as data into equipment or as a controlling signal for the equipment.

Further the blood flow in the brain optically measured as the information on the degree of the brain activation is susceptible to heart beats or the autonomic nervous system, and signals corresponding to the change of the blood flow in the skin caused by thermoregulation are superposed on the signals corresponding to the degree of the brain activation. In the method by measuring the change of the blood flow, in the brain, the signals reflecting the degree of the brain activation is superposed with unwanted signals produced by the change of the blood flow other than the blood flow in the brain. The unwanted signals are an obstacle to obtaining the actual signals for the degree of the brain activation and cause malfunction of the equipment supplied with the unwanted signals. The prior art device is not configured such that change in the degree of the brain activation was not perceived by the possessor of the brain.

SUMMARY OF THE INVENTION

It is an object of the present invention to provide a brain function signal input device capable of inputting accurate brain function signals to various kinds of external equipment by reducing noise other than the actual brain function signals based upon activity of the brain.

It is another object of the present invention to provide a brain function signal input device having immunity against the change of the body or heart beats occurring during the operation of inputting the brain function signals.

It is still another object of the present invention to improve the ease of operation of a brain function signal input device by configuring the brain function signal input device such that change in the degree of the brain activation can be perceived by the possessor of the brain.

It is still another object of the present invention to provide an equipment controlling device or a data input device having improved reliability in control by the brain function signal which is an example of signals from a living body, so as to improve performance of the equipment controlling device based upon the brain function signal.

In an embodiment of a brain function signal input device according to the present invention, initially influences of drift and fluctuations originating in signals from a living body are reduced in the measured change of the blood flow in the brain as a brain function signal, as a preliminary processing. Then noise components in the brain function signals is eliminated by processing the brain function signals based upon at least three different signal threshold levels.

The following explains a concrete means and a concrete method of eliminating the drift and fluctuations.

A brain function signal input device comprises: light projecting means for projecting near-infrared rays from a light source onto a head, light measuring means for measuring said near-infrared rays having passed through the head, data processing means for processing an output signal from said light measuring means to obtain a brain function signal, displaying means for displaying the brain function signal, and control signal generating means for generating a control signal to be supplied to an external equipment based upon the brain function signal.

The data processing means takes in the output signals from said light measuring means at a predetermined interval, calculate an average of the output signals at an interval of a predetermined number of the output signals, calculate a difference between the average and an average of the output signals a predetermine time earlier, and outputs the difference as a brain function signal.

By the above data processing, noise originating from heart beats or the change of the body and contained in the output signals from said light measuring means are eliminated, and the brain function signal having a high signal-to-noise ratio and based upon the actual brain function is obtained. Therefore the above-mentioned malfunction of equipment due to the noise is prevented.

Provision of the displaying means for displaying the brain function signal enables an operator of the brain function signal input device, i.e. the sender of the brain function signal, to operate the brain function signal input device, as he confirms the intensity of the brain function signal. Consequently, since the operator can perform the proper operation as he watches the controlled state of the equipment, the ease in the operation of the equipment is improved.

This displaying means can display the brain function signal and threshold levels in the brain function signal intensity used as the criterion for judging whether to generate the above-mentioned control signal, on the same display screen at the same time.

Further the displaying means can be provided with a function for displaying the state of the control signals generated by the control signal generating means.

The means for displaying the measured signal intensity and the controlled state gives the operator information serving as a measure for increasing or decreasing the degree of activation of the brain in controlling the equipment according to the displayed brain function signal.

By using this displayed information, the operator can control equipment as he watches the signals generated by his own brain, and therefore he can reduce wrong operation or mistaken control of the equipment control device based upon signals from the brain.

In processing the signals from the living body, at three different threshold levels are established, then a time at which the signals traverse an area separated by these threshold levels is detected and a history of intensity change of the signals from the living body is recorded. If a history of the changes of the signals, namely the pattern of the changes of the signals, matches a predetermined pattern, the control signal is generated. If a difference between two adjacent threshold levels is made larger than anticipated noises, the number of equipment malfunction due to noise is reduced.

BRIEF DESCRIPTION OF THE DRAWINGS

In the accompanying drawings, in which like reference numerals designate similar components throughout the figures, and in which:

FIG. 13 is a flow chart illustrating another data processing procedure in the data processor in the brain function signal input device.

DETAILED DESCRIPTION OF THE PREFERRED EMBODIMENTS

Embodiment 1

Figure 1:
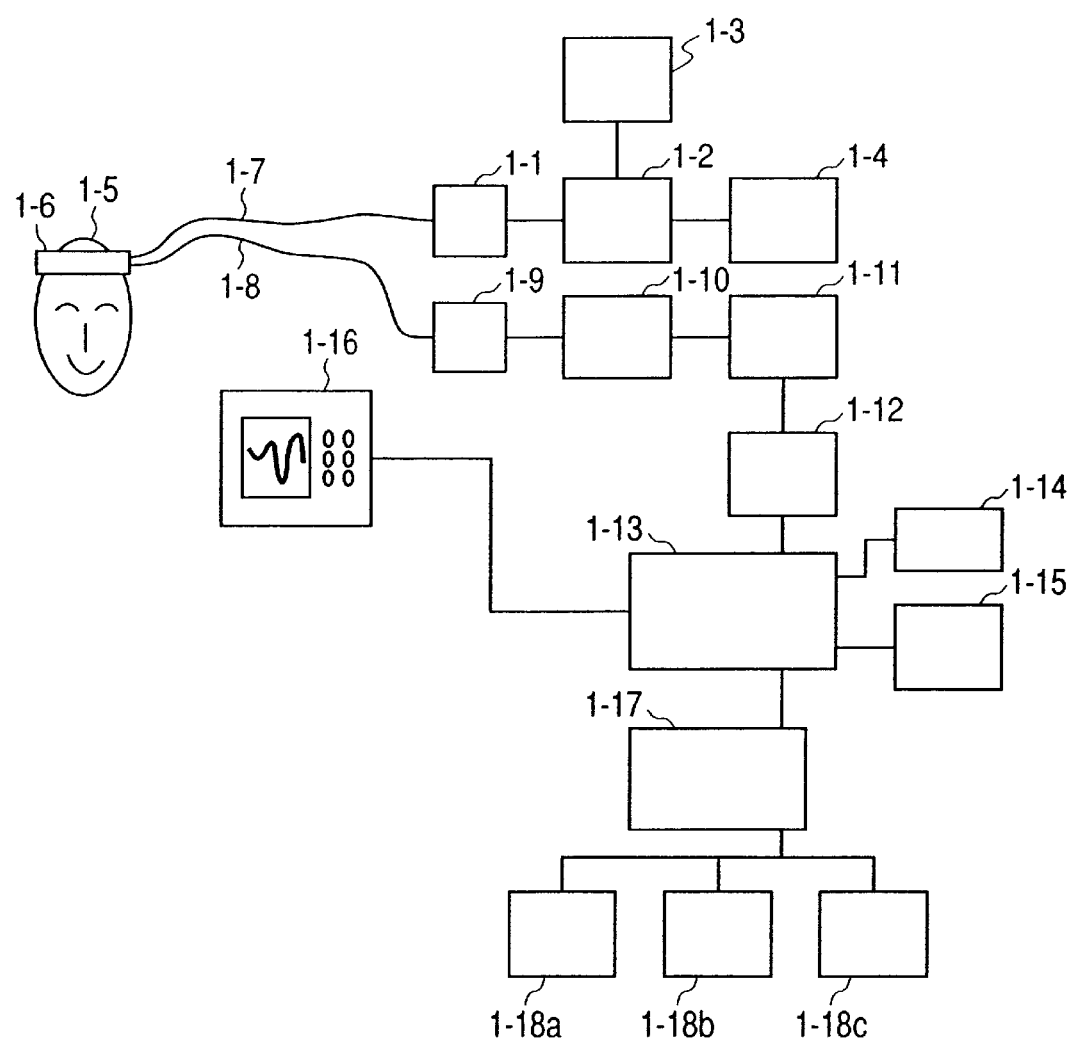
FIG. 1 is a schematic illustration of an embodiment of a brain function signal input device according to the present invention.

FIG. 1 is a schematic illustration of an embodiment of a brain function signal input device according to the present invention.

In FIG. 1, reference numeral 1-1 denotes a light source made of a semiconductor laser element, for example, for emitting near-infrared rays having wavelengths in the vicinity of 800 nm, reference numeral 1-2 denotes a light source driver for driving the light source 1-1, reference numeral 1-3 is a power supply for the light source 1-1, reference numeral 1-4 is an oscillator for oscillating a signal for modulating the intensity of the near-infrared rays emitted from the light source 1-1.

The light from the light source 1-1 is intensity-modulated by the modulating signals from the oscillator 1-4, and is guided to the head 1-5 of the operator of this brain function signal input device by a light guide 1-7 made of an optical fiber, for example. Reference numeral 1-6 denotes a probe for projecting the near-infrared rays on to the head 1-5. The near-infrared rays guided to the head 1-5 is projected into the cerebrum through the scalp of the operator.

Since it is known that each function of the brain is localized separately in the brain, the near-infrared rays are projected onto an area where a brain function intended to be used is located in the brain.

The near-infrared rays projected into the brain pass through the scalp, the skull and the brain, repeating scattering of the rays, and go out of the scalp. A portion of this near-infrared rays are absorbed by the blood in the brain while they pass through the brain. If the amount of the blood in the brain changes, the amount of the absorbed near-infrared rays changes in accordance with the change of the amount of the blood, and consequently the intensity of the near-infrared rays going out of the scalp is changed.

If the brain is activated, the amount of the blood in the brain changes and the intensity of the near-infrared rays having passed through the brain and going out of the scalp changes in accordance with the degree of the activity of the brain function.

The near-infrared rays having passed through the brain and coming out of the scalp is guided to the light detector 1-9 by the light guide 1-8. The light detector 1-9 is comprised of a photodiode, an avalanche photodiode, a photomultiplier or the like. The light detector 1-9 converts the near-infrared rays supplied by the light guide 1-8 into electrical signals. The electrical signals are amplified by the amplifier 1-10, and are supplied to the lock-in amplifier 1-11.

The lock-in amplifier 1-11 detects the electrical signals modulated by the modulating frequency from the oscillator 1-4. The output of the lock-in amplifier 1-11 is converted into digital signals by the A/D converter 1-12, and is supplied to the data processor 1-13. The data processor 1-13 is coupled with the data input means 1-14 and the memory 1-15.

The data input means 1-14 is used for inputting data into the data processor 1-13, and the memory 1-15 is used for storing data processed in the data processor 1-13 and calculated results. The data processor 1-13 obtains the intensity of the brain function signal from the measured data. The processing procedure in the data processor 1-13 will be described later.

The calculated intensity of the brain function signals is supplied to the display device 1-16 and the changes of the intensity of the brain function signals are displayed on the screen of the display device 1-16. The changes of the intensity of the brain function signals are visually checked by the operator of this device and the brain function signals are used to control external equipment.

The data processor 1-13 calculates the intensity of the brain function signals, then makes a decision over the brain function signal intensity and its change based upon the criterion having been stored in advance in the memory 1-15 via the data processor 1-13, and generates a control signal for controlling the external equipment.

The control signal from the data processor 1-13 is sent to the equipment control signal generator 1-17. The equipment control signal generator 1-17 generates the specific equipment control signal for controlling the external equipment based upon the control signal from the data processor 1-13 and sends the equipment control signal to the equipment 1-18a, the equipment 1-18b and the equipment 1-18c, so as to switch them on or off, or to set parameters in the equipment.

Figure 2:
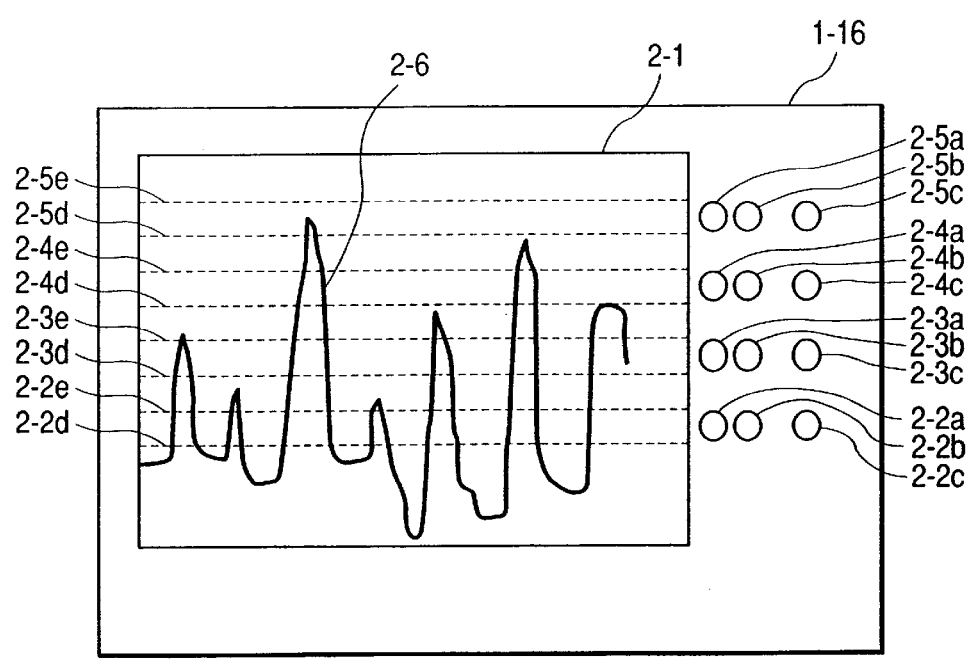
FIG. 2 is a front view of a concrete example of a display device 1-16 in the brain function signal input device shown in FIG. 1.

FIG. 2 is a front view of an example of a display device 1-16 of FIG. 1. The display device 1-16 is provided with a display screen 2-1 for displaying the changes of the intensity of the brain function signals, and is provided with lamps 2-2a, 2-2b, 2-2c, 2-3a, 2-3b, 2-3c, 2-4a, 2-4b, 2-4c, 2-5a, 2-5b and 2-5c for indicating the controlled states of the equipment.

On the display screen 2-1, the curve 2-6 shows the intensity of the brain function signals calculated by the data processor 1-13, and the lines 2-2d, 2-2e, 2-3d, 2-3e, 2-4d, 2-4e, 2-5d and 2-5e indicate the boundaries between signal intensity regions. The signal intensity regions define the regions for generating equipment control signals for controlling the external equipment. When the intensity of the brain function signals reaches the respective regions, the equipment control signal is generated.

The lower lines of the respective regions, 2-2d, 2-3d, 2-4d and 2-5d indicate the threshold levels for controlling the generation of signals as described below.

If the intensity of the brain function signal reaches one of these lower lines, the generation of the equipment control signal is pre-engaged.

After the pre-engagement, if the intensity of the brain function signal goes upward beyond the one of the lower lines and then goes below the one of the lower lines, the equipment control signal is generated.

If the intensity of the brain function signal goes below one of the lower lines without the above-mentioned pre-engagement, the equipment control signal is not generated.

On the other hand, if the intensity of the brain function signals goes upward beyond one of the upper lines of the respective regions, 2-2e, 2-3e, 2-4e and 2-5e, the pre-engagement is canceled which has been made when the intensity of the brain function signal went upward beyond the lower line of the region associated with the one of the upper lines.

With this construction, the operator of this device can control various kinds of external equipment as he watches the intensity of the brain function signals and a signal region having generated the equipment control signal on the display device 1-16 and therefore the control with reduced malfunctions is possible.

The lamps 2-2a, 2-3a, 2-4a and 2-5a are provided for the respective signal-generating regions, and lighted lamps indicate a control signal having been generated in the corresponding signal-generating region.

Lighting of the lamp 2-2a indicates the existence of pre-engagement for generating a control signal having been made when the intensity of the brain function signals went upward beyond the lower line 2-2d of the corresponding signal-generating region, the lamps 2-2b, 2-3b, 2-4b and 2-5b are lighted for a predetermined length of time when a control signal is generated in a respective signal-generating region, and they are switched off. At this time, the lamps 2-2a, 2-3a, 2-4a and 2-5a indicating the existence of the pre-engagement for generating a control signal in the corresponding signal-generating region are switched off at the same time. The lamps 2-2c, 2-3c, 2-4c and 2-5c are switched alternately on and off every time a control signal is generated in the corresponding signal-generating region.

In this embodiment, lamps are used for occurrence of the control signals, but instead of the lamps, appearance and disappearance of a specific pattern on the display screen 2-1 can indicate the occurrence of the control signals.

The data processing procedure by the data processor 1-13 will be explained by referring to the flow charts shown in FIGS. 3 and 4. FIG. 4 is a detail of a portion of the flow chart of FIG. 3.

Figure 3:
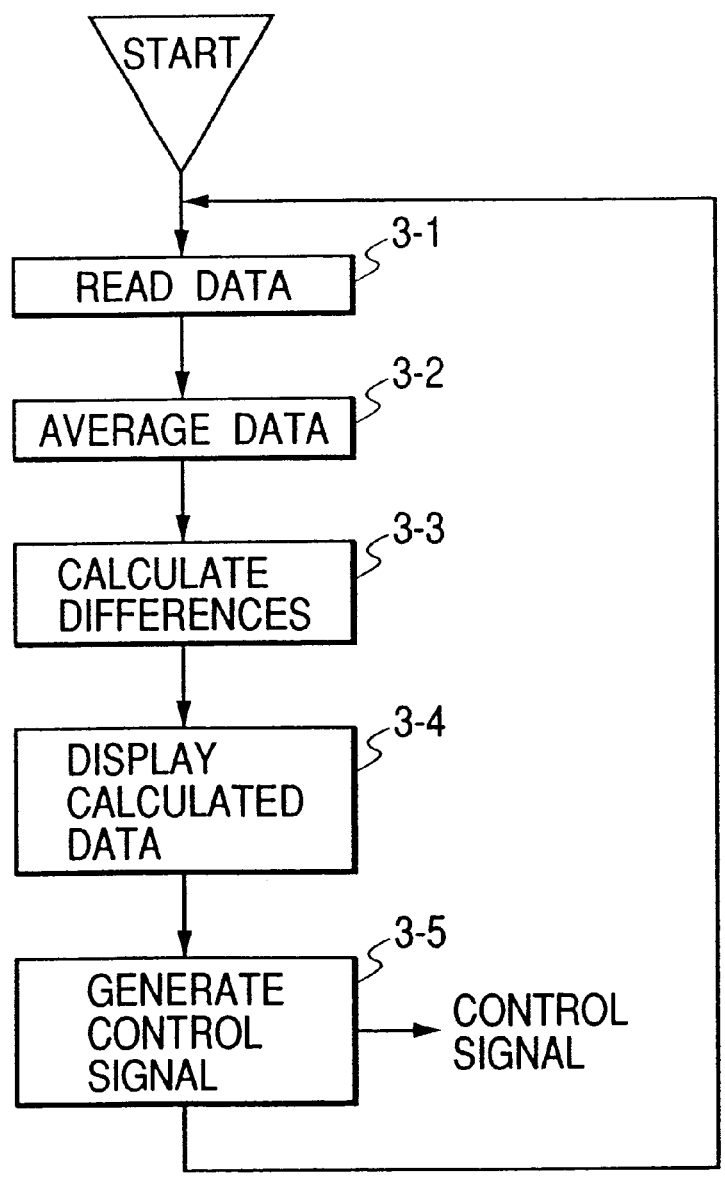
FIG. 3 is a flow chart illustrating a data processing procedure in the data processor 1-13 in the brain function signal input device of FIG. 1.
Figure 4:
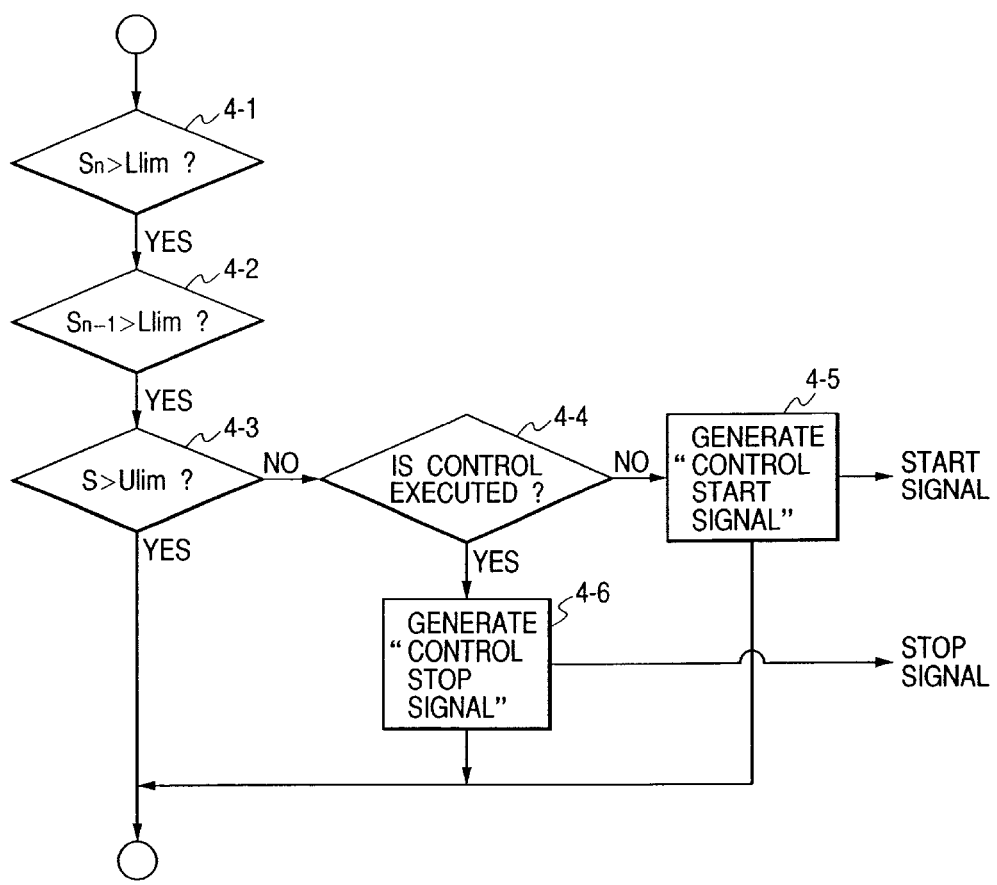
FIG. 4 is a detailed flow chart illustrating a data processing procedure in the step 3-5 in the flow chart of FIG. 3.

In Step 3-1 in FIG. 3, the output of the lock-in amplifier 1-11 having been converted into digital signals by the A/D converter 1-12 is read into the data processor 1-13. In this embodiment the data are read in at an interval of 0.1 seconds. This data is on the intensity of the near-infrared rays having passed through the brain, and one example of this data is shown in FIG. 5, the abscissa representing time and the ordinate representing the intensity of the signals.

Figure 5:
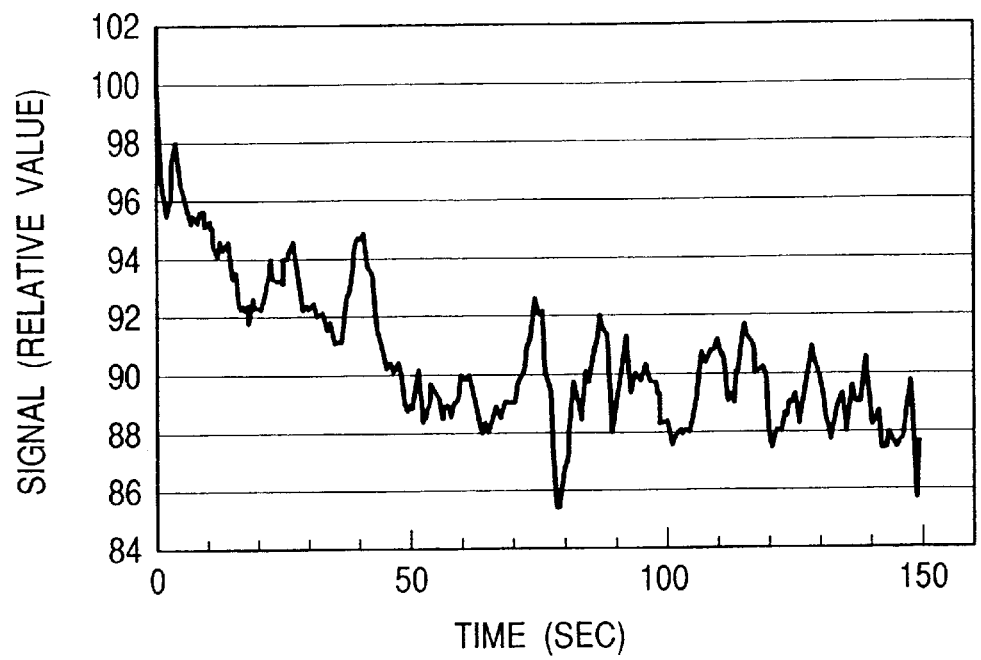
FIG. 5 is a graph of one example of signals corresponding to the intensity of light having passed through the brain to be input to the data processor 1-13 in the brain function signal input device of FIG. 1.

The data shown in FIG.5 are data measured on brain function signals produced in the so-called motor area of the brain when an operator of this device when he repeated closing a hand and opening the hand alternately. This data clearly show signals of large-amplitudes corresponding to movements of the hand and signals of small-amplitudes corresponding to heartbeats are superposed on signals decaying slowly from the start of measurement.

The signals of large amplitudes also include signals caused by the change of the body temperature and signals supposed to be caused by autonomic nerves for unknown causes.

In Step 3-2 in FIG. 3, for the purpose of eliminating the signals caused by the heartbeats, but not reflecting the intention of the operator, the average of latest ten signals is calculated every time a new signal is read in. By this averaging, the signal components corresponding to the heartbeats are eliminated.

By choosing the number of read-in signals for one averaging to be more than the number of the signals read-in within the period of the heartbeats, the influences by the heartbeats can be effectively eliminated.

Figure 6:
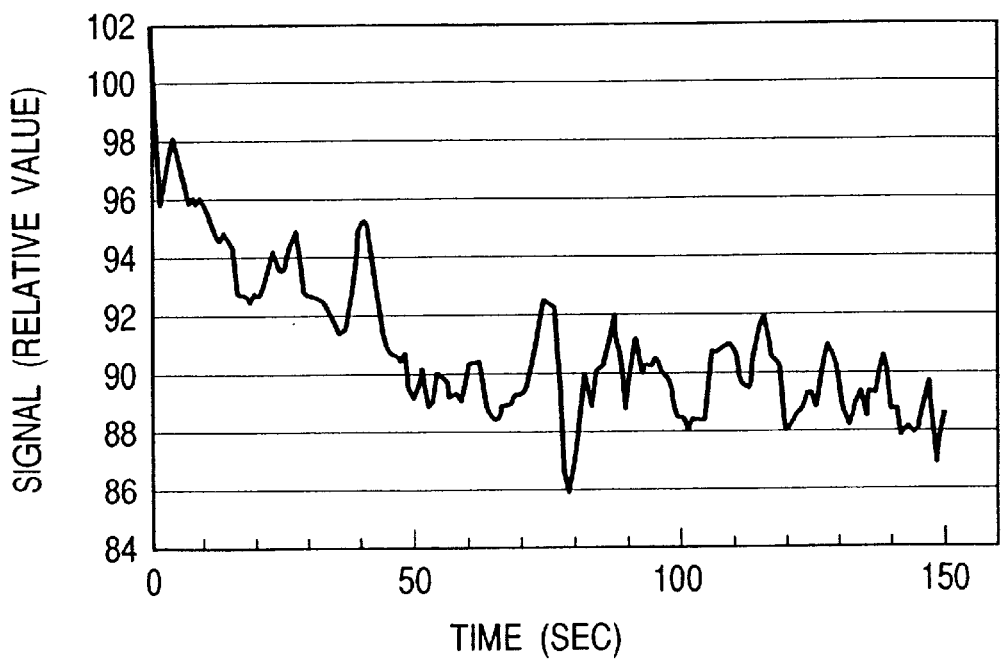
FIG. 6 is a graph of the averaged signals obtained by performing a first noise-eliminating treatment (averaging operation) on the signals shown in FIG. 5.

Suppose the heart beats 80 times per minute, then the number of signals read in within 0.75 seconds, a period of the heartbeats, is 8. In this embodiment, the averaging is calculated over ten signals to eliminate the influences by the heartbeats more effectively. FIG. 6 shows the data of the brain function signals obtained by the above averaging.

The influences by the heartbeats are absent in the curve shown in FIG. 6, but the slowly decaying signal components still remain. The next step 3-3 eliminates this signal components.

In Step 3-3 in FIG. 3, by using the averaged signals calculated in Step 3-2, a subtraction of the latest averaged signal from the averaged signal a predetermined time earlier is formed. If the brain function is activated, the amount of blood in the brain increases and the transmission of the near-infrared rays through the brain is decreased. Therefore the subtracted signals calculated in Step 3-3 become positive when the brain function is activated, and the subtracted signals become negative when the brain function is calmed. In this embodiment, a subtraction of the latest averaged signal from the averaged signal four seconds earlier is performed. The results obtained by this subtraction processing are shown in FIG. 7.

Figure 7:
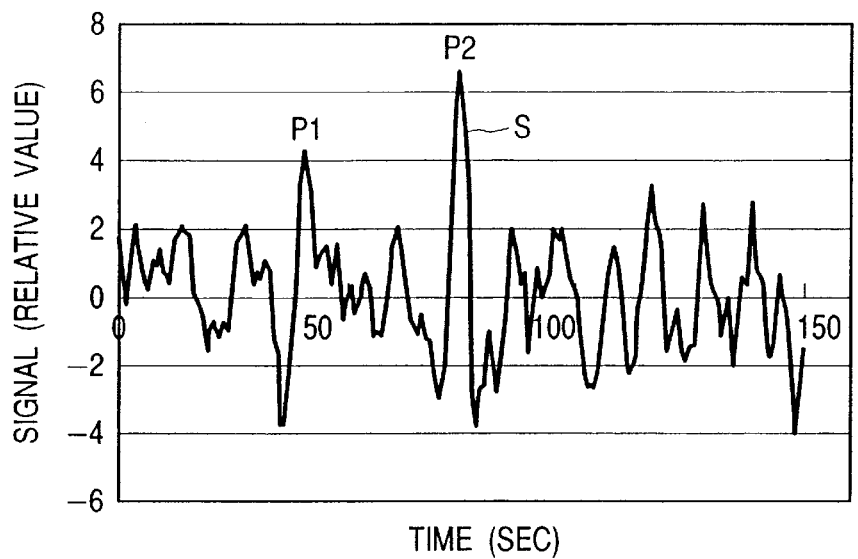
FIG. 7 is a graph of a brain function signal obtained by performing a second noise-eliminating treatment (subtracting operation) on the averaged signals shown in FIG. 6.

The slowly decaying signal components are absent in the curve in FIG. 7, and the peaks corresponding to the brain function activity remain and is pronounced. Therefore accurate control of external equipment is made possible by generating an equipment control signal in accordance with the magnitude of the peak. The curve 2-6 in FIG. 2 of the brain function signals displayed on the display device 1-16 (FIG. 1) is another example similar to that of FIG. 7.

In Step 3-4 in FIG. 3, the curve of the brain function signals obtained by the subtraction processing in Step 3-3 is shown on the display screen of the display device 1-16.

In Step 3-5 in FIG. 3, the peaks in the curve in FIG. 7 of the brain function signals obtained by the subtraction processing in Step 3-3 are judged, and then the process for generating control signals is performed.

A plurality of control regions having different levels are defined by a pair of threshold levels 2-2d and 2-2e, a pair of threshold levels 2-3d and 2-3e, a pair of threshold levels 2-4d and 2-4e, and a pair of threshold levels 2-5d and 2-5e, as shown in FIG. 2. In the respective control regions, hereinafter the lower boundary will be referred to as the lower threshold Llim and the upper boundary will be referred to the upper threshold Ulim. Further the intensity of the brain function signals (FIG. 7) obtained by the subtraction processing in Step 3-3 is referred to as S.

The procedure for generating control signals will be explained in detail by reference to FIG. 4.

Step 4-1 in FIG. 4, judges if the intensity S of the brain function signals obtained in the previous step 3-3 is larger than the lower thresholds (Llim) in the respective control regions. Judge if the signal intensity Sn at the present time is larger than a lower threshold (Llim) of a control region having a level (Sn>Llim?). If the decision is yes, go to Step 4-2, but if the decision is no, go to a Judgment step for a next control region.

In Step 4-2 in FIG. 4, judge if the signal intensity Sn−1 immediately before the signal intensity Sn if the lower threshold (Llim) of the control region (Sn−1>Llim?). If the decision is yes, go to Step 4-3, but if the decision is no, go to a Judgment step for a next control region.

In Step 4-3 in FIG. 4, judge if any of the previous signal intensities S have been larger than the upper threshold (Ulim) (S>Ulim?). If the decision is yes, go to a Judgment step for a next control region, but if the decision is no, go to Step 4-4.

In Step 4-4 in FIG. 4, judge if the control operation to be executed in response to the signal intensity of the control region is being executed (Is Control being executed?). If the decision is yes, go to Step 4-6, but if the decision is no, go to Step 4-5.

In Step 4-5 in FIG. 4, generate a command signal to start the control operation and send it to a control system of the equipment to be controlled.

On other hand, in Step 4-6 in FIG. 4, generate a command signal to stop the control operation having been executed and send it to a control system of the intended equipment.

After the generation of the command signal to start control operation or to stop control operation, go to a Judgment step for a next control region.

After completing Judgment steps for all the control regions established in advance, go to a step for taking in the next brain function signals.

Embodiment 2

Figure 8:
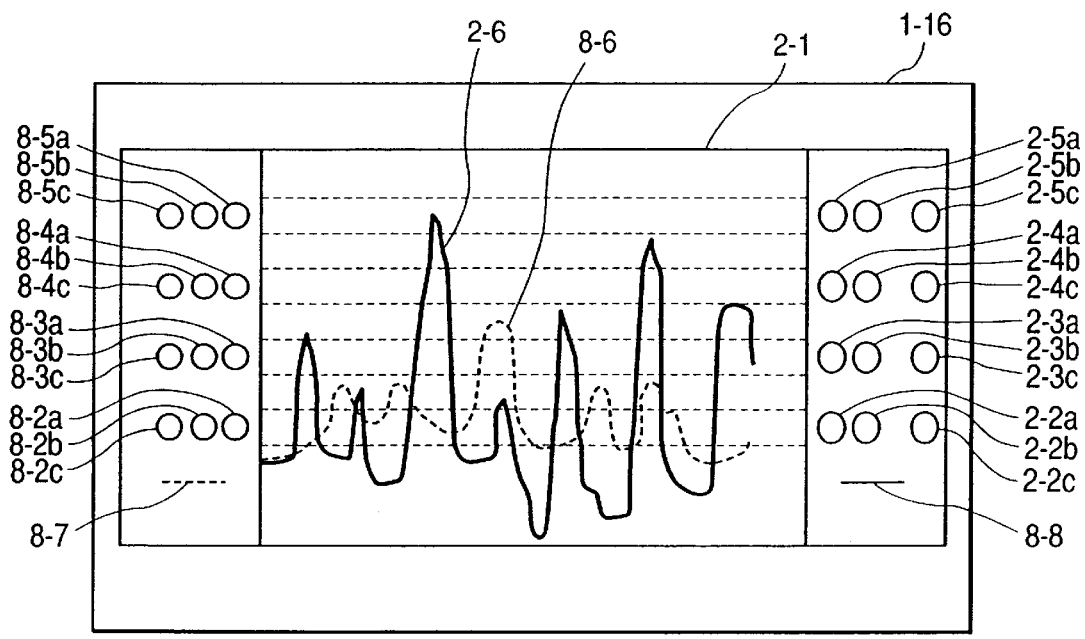
FIG. 8 is a front view of a concrete example of a display device 1-16 in another embodiment of a brain function signal input device according to the present invention.

FIG. 8 is a front view of another example of a display device in a brain function signal input device according to the present invention. This embodiment is configured to be capable of taking in two brain function signals at the same time. Therefore this embodiment is provided with two systems of light projecting means and light detecting means, while the embodiment of FIG. 1 is provided with one system of, light projecting means and light detecting means. The number of the systems of the data processors is increased to two.

The two systems in this embodiment are identical in operation with the system of Embodiment 1, and an illustration of structures other than a display device for this embodiment is omitted.

In a display device 1-16 of this embodiment, two brain function signals from the two measuring systems of the brain function signals are displayed on the same display screen.

As shown in FIG. 8, on the display screen 2-1, two brain function signals are indicated as two signal intensity curves 2-6 and 8-6. The criterion for establishing a plurality of control regions for generating control signals for two brain function signals are the same with Embodiment 1, and the thresholds in the respective control regions for generating control signals are set to be the same values for the two brain function signals. But the thresholds in the respective control regions for generating control signals can be set to be different values for the two brain function signals.

The indication of the controlled state of the equipment by each brain function signal is performed by the lamps 2-2a, 2-2b, 2-2c, 2-3a, 2-3b, 2-3c, 2-4a, 2-4b, 2-4c, 2-5a, 2-5b, 2-5c disposed on the right side for one system, and the lamps 8-2a, 8-2b, 8-2c, 8-3a, 8-3b, 8-3c, 8-4a, 8-4b, 8-4c, 8-5a, 8-5b and 8-5c disposed on the left side for the other system. The contents of information displayed by these lamps are the same with Embodiment 1.

In this embodiment, one signal intensity curve 2-6 is indicated by a solid curve, the other signal intensity curve 8-6 is indicated by a broken curve, and the solid line 8-8 indicated below the lamps disposed on the right side indicates these lamps correspond to the solid curve 2-6, and the broken line 8-7 indicated below the lamps disposed on the left side indicates these lamps correspond to the solid curve 8-6.

The data processing of measured signals by the data processor and the judgment by the control signal generating means are the same with Embodiment 1.

In this embodiment, two brain function signals are displayed and are used to control external equipment, the number of the brain function signals can be increased.

Embodiment 3

Figure 9:
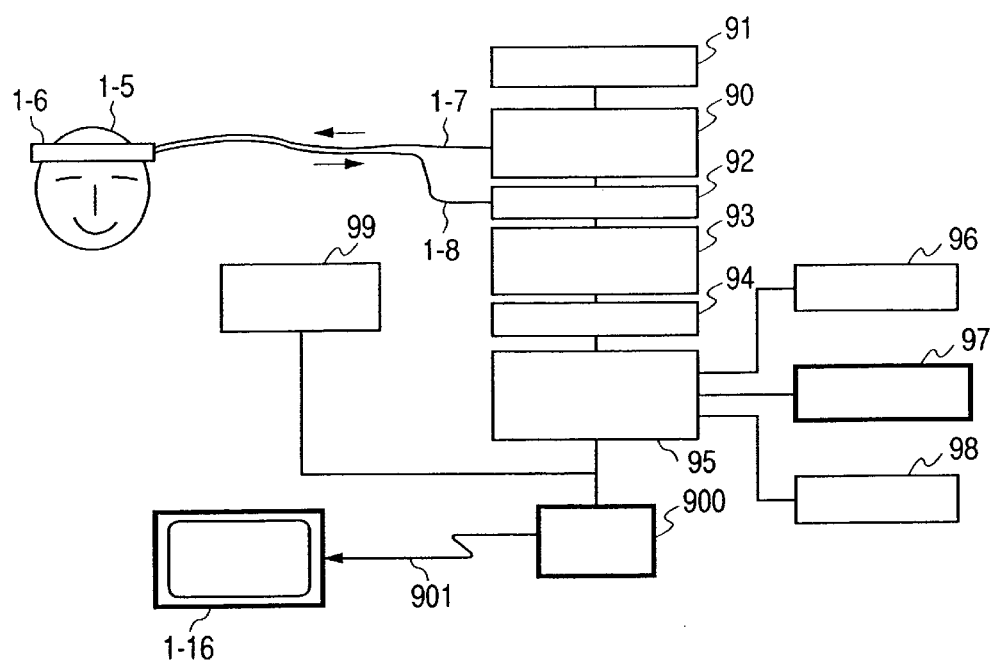
FIG. 9 is a schematic illustration of another embodiment of a brain function signal input device according to the present invention.

First the construction of this embodiment will be explained by reference to FIG. 9.

Reference numeral 90 denotes a semiconductor laser element having an oscillating wavelength in the near-infrared rays. In this embodiment, the oscillating wavelength is 800 nm, but it may be in range of 700 nm to 850 nm. Reference numeral 91 denotes an oscillator for intensity-modulating the output rays from the semiconductor laser element 90. In this embodiment, the modulating frequency is 1 kHz, but it may be different from 1 kHz. Reference numeral 1-7 denotes an optical fiber for guiding the light from the light source 90 to a head of an operator of equipment. An optical fiber bundle made of fibers tied up in a bundle can be used instead of an optical fiber. Reference numeral 1-5 denotes a living body of the operator of this embodiment such as a head, and reference numeral 1-6 is a faster for fixing the tip of the optical fiber at a specific position of the head of the operator.

Reference numeral 1-8 denotes an optical fiber for guiding the light having been projected onto the head, been scattered and reflected within the head, passed through the head to the photodetector. Reference numeral 92 is a photodetector made of avalanche photodiode for converting the light supplied by the optical fiber 1-8 into electrical signals. Reference numeral 93 is a lock-in amplifier for eliminating electrical noise component from the electrical signals from the photdetector 92. Reference numeral 94 is an A/D converter for converting the analog signals from the lock-in amplifier 93 into digital signals. Reference numeral 95 is a control device for processing the digital signals from the A/D converter 94. The control device 95 is coupled with the input device 96, the data processor 97 and the memory 98. The input device 96 inputs data necessary for control of equipment, and the data processor 97 performs calculation for making decisions on the kind of control by using the signals or data input to the control device 95.

The memory 98 stores the results of processing and necessary data. The input device 96 is also coupled with the signal display device 99 and the control signal generating device 900.

The signal display device 99 displays the intensity of brain function signals, an example of signals from a living body and the controlled state of the equipment based upon the brain function signals. The control signal generating device 900 generates control signals for controlling the equipment based upon control signals from the control device 95, and in this embodiment the control signal generating device 900 serves a controller of a TV receiver set. Reference numeral 1-16 denotes the TV receiver set, and reference numeral 901 is the infrared rays carrying the control signal from the controller 900 to the TV receiver set 1-16.

Figure 10:
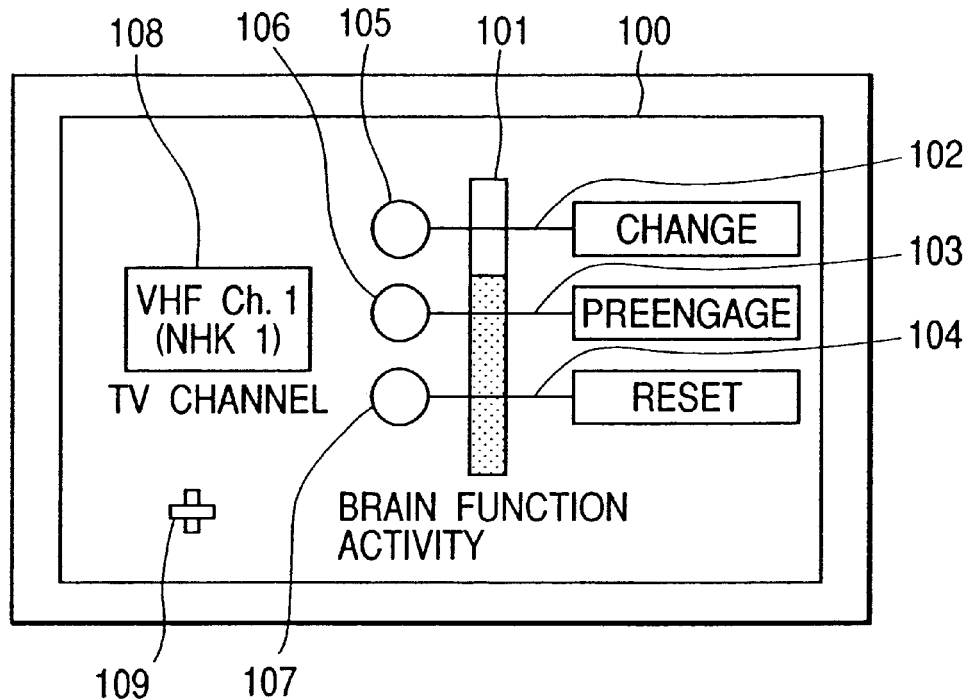
FIG. 10 is a front view of a concrete example of a display device 99 in the brain function signal input device shown in FIG. 9 for displaying the intensity of the brain function signal, an example of signals from a living body, and the controlled state of equipment.

The signal display device 99 displays brain function signals, an example of signals from a living body, and its display screen is shown in FIG. 10. Reference numeral 100 is a bezel, reference numeral 101 is a rectangular pattern for indicating the intensity of light having passed through the brain, reference numerals 102, 103 and 104 are lines indicating thresholds for subdividing the signal intensity region. Reference numeral 105, 106 and 107 are lamps such as LEDs for indicating a history of the signal intensity changes. As described later, these lamps are switched on or off in accordance with setting of the parameters representing the controlled state of the equipment. Reference numeral 108 is a window for indicating the TV channel being selected, and reference numeral 109 is a release switch for initializing the display or the state of control.

Figure 11:
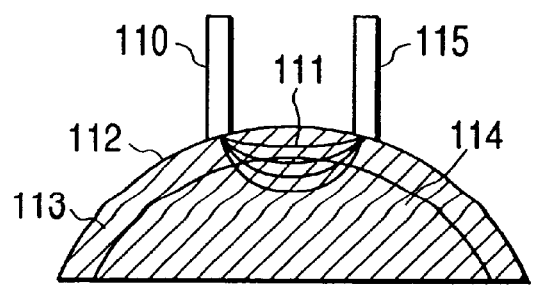
FIG. 11 is an illustration for explaining the scattering and transmission of light in the brain.

The operating principle of the device of this embodiment will be described. FIG. 11 illustrates scattering and transmission of the laser light 111 projected onto the head from the optical fiber 110. The near-infrared rays 111 projected onto the scalp 112 pass through the scalp 112, the skull 113 while they are scattered and reflected repeatedly, and then they reach the cerebrum 114. The near-infrared rays 111 travel further into the cerebrum 114, and then some of them pass through the skull and the scalp and appear on the surface of the head. The near-infrared rays having come out of the head are sent to the photodetector via the optical fiber 115 for light detection. If the optical fiber 115 for light detection is positioned within 30 mm from the optical fiber 110 for projecting the laser light onto the head, the sufficient amount of the scattered and transmitted light is detected.

There is blood in the cerebrum 114 for supplying nutrition and oxygen necessary for the tissue of the cerebrum 114 and activity of the cerebrum 114. Therefore the intensity of the laser light decays due to absorption of the blood as well as to scattering by the cerebrum tissue while the laser light passes through the cerebrum 114. Decaying by scattering of the laser light by the cerebrum tissue is substantially constant because no abrupt changes occur in the brain tissue morphology. The measured data disclosed in Japanese Patent Application Laid-open Hei 9-149894 show that the amount of the blood in the cerebrum varies with activity of the cerebrum. This means the change in intensity of the light having been scattered in and passed through the cerebrum reflect the activity of the cerebrum. Therefore the activity of the cerebrum can be measured quantitatively by measuring the change in intensity of the light having passed through the cerebrum.

The human brain has various kinds of functions, different areas in the brain perform different functions, and a distribution of functions in the brain is well-known as Brodmann Brain Mapping. Consequently a brain function to be used for controlling of equipment can be selected by selecting a position in the head to be illuminated by the laser light.

In this embodiment, the light-projecting tip of the optical fiber 1-7 is fixed at a position of the motor area (Brodmann's area 4) in the brain handling movement of a hand for the purpose of using brain function signals intended for movement of a hand.

A light having a wavelength of 800 nm from the semiconductor laser element 90 and modulated with a frequency of 1 kHz is projected from the tip of the optical fiber 1-7 onto the head, and a portion of the projected light passes through the area of the cerebrum handling movement of a hand and enters an end of the light detecting optical fiber 1-8 and is converted into electrical signals by the photodetector 92. The lock-in amplifier 93 selectively extracts signal components having a modulating frequency of 1 kHz from the electrical signals. This selection eliminates influences not originating from the semiconductor laser element 90, that is, the influences caused by external lights.

The output from the lock-in amplifier is converted into digital signals by the A/D converter and is then supplied to the control device 95. The control device 95 displays the signal intensity based upon the signals supplied, judges if the change of the signal intensity matches a predetermined pattern and sends an equipment control signal generating command to a control signal generating device based upon the judgment. This procedure will be described later.

In this embodiment, brain function signals handling movement of a hand are used and the intensity of signals proportional to the amount of movement of a hand is displayed in the signal intensity display device 99. Consequently the operator of the device of this embodiment can adjust the amount of movement of a hand and control equipment accurately as intended while he watches the intensity of brain function signals displayed on the signal intensity display device 99.

The signal for controlling the equipment is generated if the history of the changes of intensity of brain function signals satisfies a predetermined condition.

In this embodiment, a signal for changing the TV channel is generated as described below.

Figure 12:
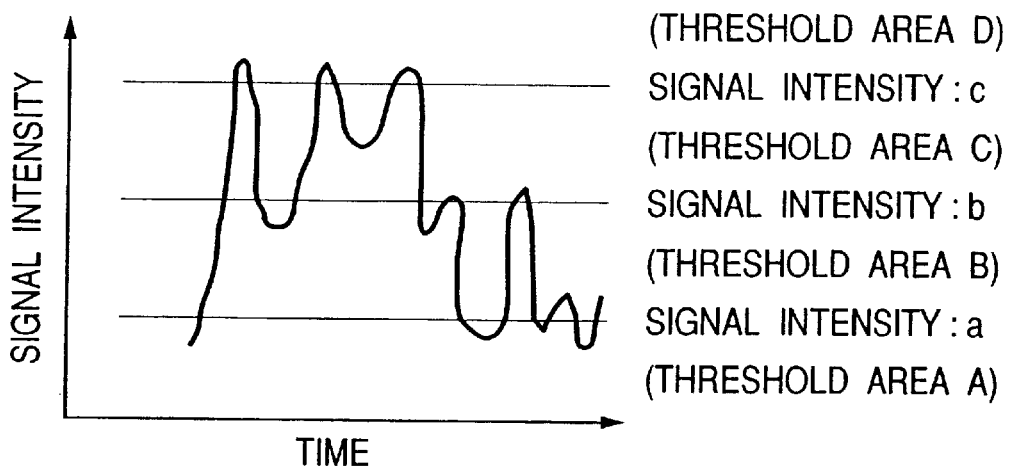
FIG. 12 is an illustration for establishing threshold levels for dividing the intensity changes of the brain function signal, an example of signals from a living body, into plural sections.

First, to judge the changes of brain function signals, brain function signals are divided into four band regions as shown in FIG. 12. Letters a, b and c are values to be set.

The intensity of the brain function signals is represented by s. A signal intensity area where $a \geq s$ is referred to as Section A, a signal intensity area where $b \geq s > a$ is referred to as Section B, a signal intensity area where $c \geq s > b$ is referred to as Section C, and a signal intensity area where $s > c$ is referred to as Section D.

Next as parameters representing the controlled state, a parameter for pre-engagement of changing the channel is represented by CH, and a parameter for changing the channel is represented by PRE. Each parameter can take 0 and 1 alternately, when the intensity of brain function signals changes in the following way.

The following explains a concrete example of the changes of the parameters.

The parameter for changing the channel, CH, is set as 1 if the intensity S of brain function signals changes from Section B to Section C. CH is set as 0 if the intensity S of brain function signals changes from Section C to Section D, or if the intensity S of brain function signals changes from Section B to Section A.

The parameter for changing the channel, PRE, is set as 1 if the intensity S of brain function signals changes from Section C to Section D. PRE is set as 0 if the intensity S of brain function signals changes from Section B to Section A.

When the intensity S of brain function signals changes from Section C to Section D, if the parameter for changing the channel, CH has been set as 1, the command for generating the signal for changing the channel is sent to the signal generating device from the control device and then the signal for changing the channel is generated.

Figure 14:
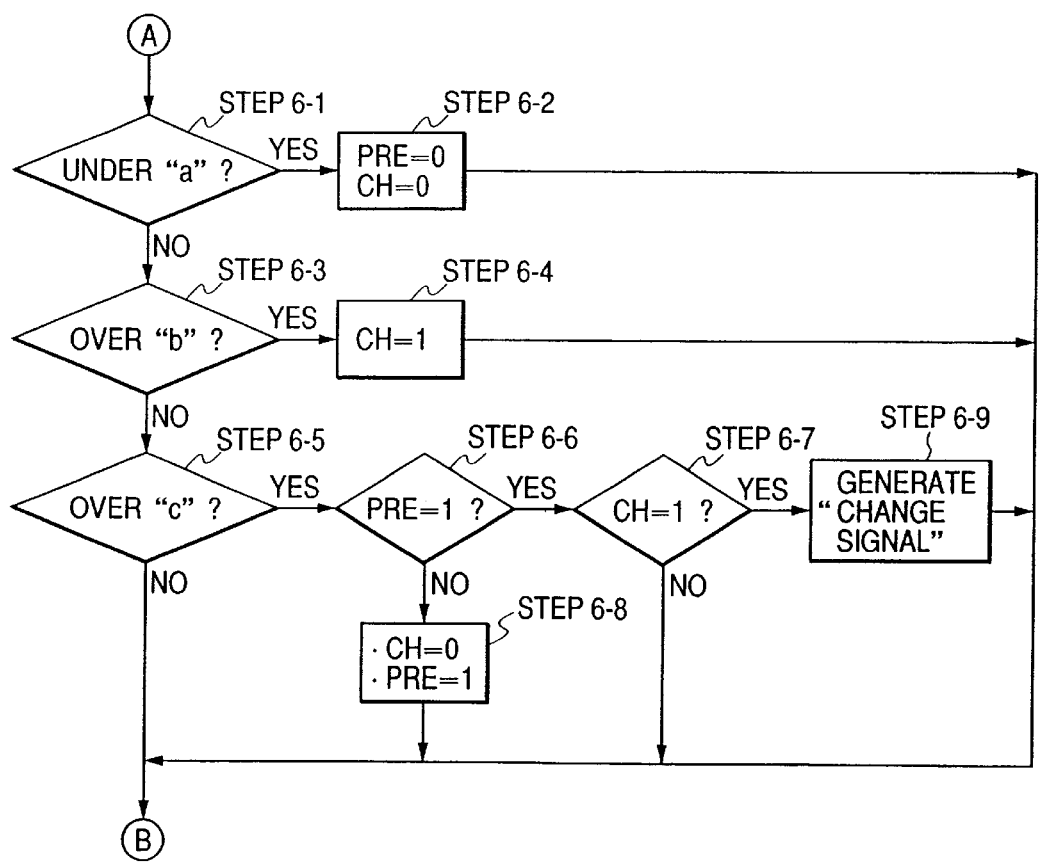
FIG. 14 is a flow chart illustrating another data processing procedure in the data processor in the brain function signal input device.

The control procedure will be explained by reference to the flowcharts of FIGS. 13 and 14. The control procedure is divided into a main flow for control in FIG. 13 and a signal judgment flow in FIG. 14.

First a main flow for control will be explained in connection with FIG. 13. By switching on the control device, Step 5-1 is started. The constituent devices are switched on by starting Step 5-1. Then projection of the laser light onto the head is started for measuring the brain function. Each step will be explained below.

Step 5-2

Input the parameters for setting the operation of the control device, the parameters a, b and c used for subdividing the intensity area of brain function signals, for example. Inputting data is carried out at the input device or by reading out data stored in the memory device.

Step 5-3

Read in the intensity of the laser light having passed through the head. After reading in data, a series of data processing on the data is performed, and then another data is read in and the series of data processing on new data is performed, and this operation is repeated.

Step 5-4

Display the read-in laser light intensity on the display device.

Step 5-5

Next display the controlled state of the external equipment. After first reading-in data, the controlled state of the equipment is the state as initially set, and after second reading-in data, the controlled state of the equipment is based upon the read-in data.

Step 5-6

Check if there is "stop command." If the stop command is present, discontinue the operation of the control device. If the stop command is absent, perform a judgment based upon read-in data as shown in FIG.14, and generate a control signal based upon the result of the judgment. After completing this processing, return to Step 5-3 and read-in next data.

The judgment flow will be explained in connection with FIG. 14.

Step 6-1

Judge if the data having been last read-in went downward beyond the threshold "a". If the previous data was in Section B and the present data is in Section A, this means the data went down ward beyond "a." If the data went downward beyond "a", go to Step 6-2, but if the data did not go downward beyond "a", go to Step 6-3.

Step 6-2

Set the parameter PRE=0 and the parameter CH=0, and then go to the control flow of FIG. 13.

Step 6-3

Judge if the data having been last read-in went upward beyond threshold "b". If the judgment is yes, go to Step 6-4, but if the judgment is no, go to Step 6-5.

Step 6-4

After setting the parameter CH=1, go to the control flow of FIG. 13.

Step 6-5

Judge if the data having been last read-in went upward beyond threshold "c". If the judgment is yes, go to Step 6-6, but if the judgment is no, go to the control flow of FIG. 13.

Step 6-6

Judge if the parameter PRE has been set as 1. If the judgment is yes, go to Step 6-7, but if the judgment is no, go to step 6-8.

Step 6-7

Judge if the parameter CH has been set as 1. If the judgment is yes, go to Step 6-9, but if the judgment is no, go to the control flow of FIG. 13.

Step 6-8

After setting the parameter PRE=1 and the parameter CH=0, go to the control flow of FIG. 13.

Step 6-9

Send the command for generating the signal for changing the channel to the signal generating device, set the parameter CH=0, and then go to the control flow of FIG. 13.

A simple method of generating a control signal is to generate a control signal in accordance with brain function signals. But the brain function signals sometimes change unexpectedly due to autonomous variations of a living body or movement of the body, or noise caused in the measuring device. To avoid errors in control caused by such changes, in this embodiment, three thresholds are established in the intensity of the brain function signals, and the control signal is generated only when the changes crossing the threshold occur.

In this case, if a difference between the adjacent thresholds is selected to be larger than fluctuations of respective brain function signals or noise, the errors due to the fluctuations or noise in equipment control are avoided.

In this embodiment the brain function signals are detected from the motor area in the brain, they can be detected from other areas in the brain depending upon the kind of equipment control.

In this embodiment, the brain function signals are measured at a single position, but they can be measured at a plurality of positions for various kinds of control, or sophisticated control.

Embodiment 4

Figure 15:
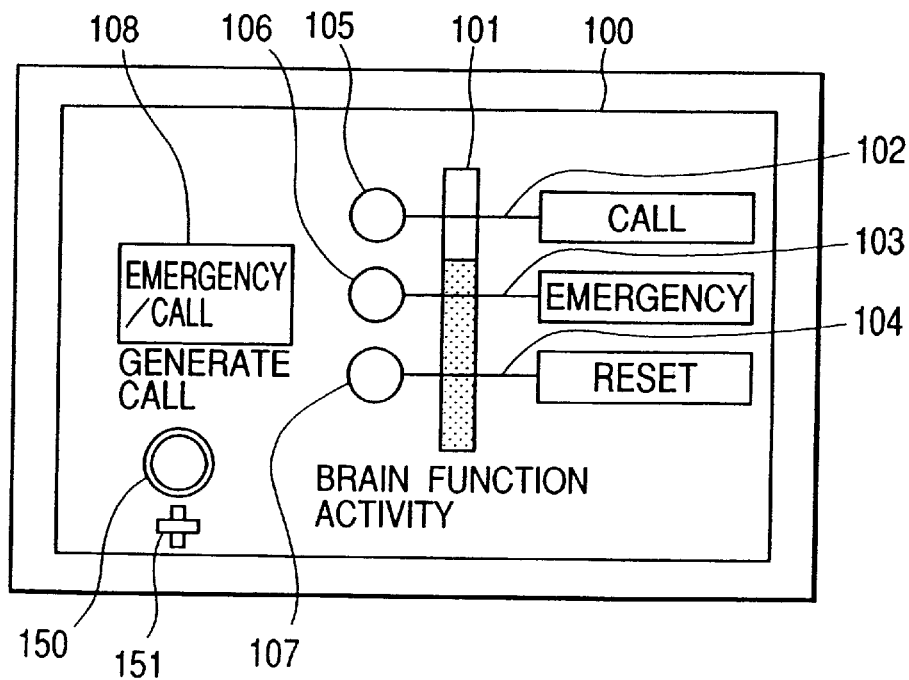
FIG. 15 is a front view of a display device for the intensity of the brain function signal and the state of calls generated by the brain function signal input device.

This embodiment uses brain function signals, an example of signals from a living body, for the patient calls. FIG. 15 is a front view of another example of a display device in a brain function signal input device according to the present invention. The portions for measuring brain function signals and for signal processing of this embodiment is the same with Embodiment 1. A difference between this embodiment and Embodiment 1 is that in this embodiment the equipment controlled by the control signal is the patient call generating equipment.

This patient call generating equipment generates the patient call based upon the command for generating the patient call from the control device. The patient call is sent to the patient call receiver installed at a nurses' station by wire or wireless. The generated calls are an ordinary call and an emergency call. The call is generated depending upon a history of the changes of brain function signals S.

To judge a history of the signal changes, the signal intensity range is divided as shown in FIG. 12, and three parameters EMC, PRE and ODC are used to represent histories of changes of brain function signals to judge the history of the signal intensity.

Each parameter can take 0 and 1 alternately, when the intensity of brain function signals changes in the following way. Each parameter is defined as below.

The parameter EMC is set as 1 if the intensity S of brain function signals changes from Section A to Section B. EMC is set as 0 if the intensity S of brain function signals changes from Section C to Section D. In this case the control device sends a command for generating an emergency generating to the signal generating device, and the emergency call is generated.

The parameter PRE is set as 1 if the intensity S of brain function signals changes from Section A to Section B. PRE is set as 0 if the intensity S of brain function signals changes from Section B to Section C.

When the intensity S of brain function signals changes from Section B to Section C, if the parameter PRE has been set as 1, the parameter ODC is set as 1, but if the parameter PRE has been set as 0, the parameter ODC is set as 0. When the ODC is set as 1, the control device sends a command for generating a ordinary call to the signal generating device and then an ordinary call is generated. When the parameter ODC is set as 0, if an ordinary call has been generated, the ordinary call is canceled.

Next, the control procedure will be explained by reference to a flowchart of FIG. 16. The control procedure is divided into a main flow of the control of FIG. 13 and a signal judgment flow of FIG. 16. The main flow of the control of FIG. 13 is the same with Embodiment 1. The judgment of histories of the changes of the signal intensity will be explained below in connection with FIG. 16.

Step 9-1

Check a signal-release switch of the display device. If the switch is on, go to Step 9-2, but if the switch is off, go to Step 9-3.

Step 9-2

Figure 16:
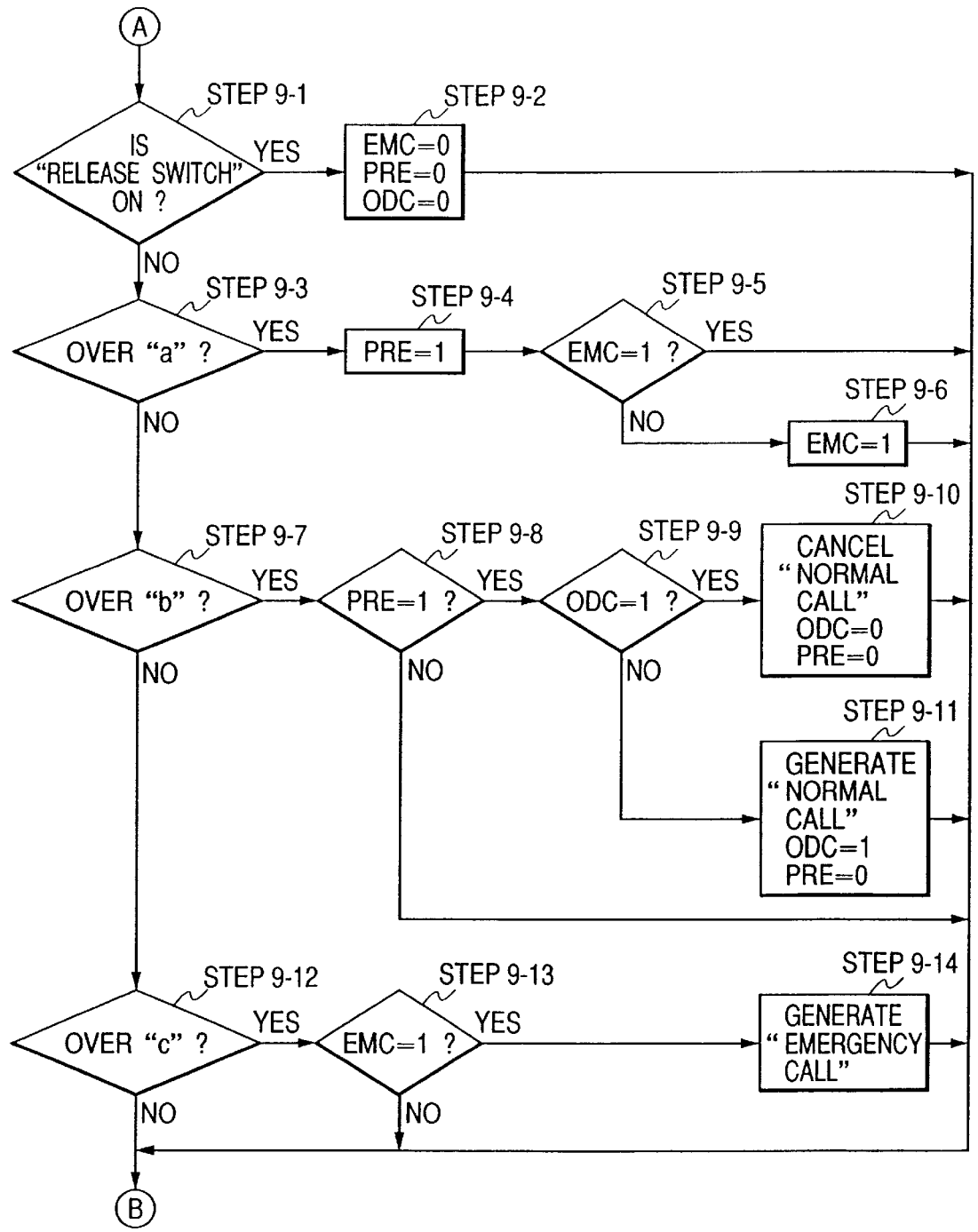
FIG. 16 is a flow chart illustrating another data processing procedure in the data processor in the brain function signal input device.

Set the parameters EM=0, PRE=0, and ODC=0, go to B (at the bottom of FIG. 16).

Step 9-3

Judge if the data having been last read-in went upward beyond threshold "a". If the previous data was in Section A and the present data is in Section BA, this means the data went upward beyond "a." If the data went upward beyond "a", go to Step 9-4, but if the data did not go upward beyond "a", go to Step 9-7.

Step 9-4

Set the parameter PRE=0.

Step 9-5

Check the parameter EM. If the parameter EM=1, go to A of FIG. 3, but if the parameter EM=0, go to Step 9-6 and at Step 9-6, set the parameter EM=1, then go to A of FIG. 13.

Step 9-7

Judge if the data having been last read-in went upward beyond threshold "b". If the judgment is yes, go to Step 9-8, but if the judgment is no, go to Step 9-12.

Step 9-8

Judge if the parameter PRE has been set as 1. If the judgment is yes, go to Step 9-9, but if the judgment is no, go to A of FIG. 13.

Step 9-9

Judge if the parameter ODC has been set as 1. If the judgment is yes, go to Step 9-10, but if the judgment is no, go to Step 9-11.

Step 9-10

Set the parameter PRE=0 and the parameter ODC=0, and if the ordinary call has been generated, cancel the ordinary call, then go to A of FIG. 13.

Step 9-11

Send the command for generating the ordinary call to the signal generating device, and set the parameter ODC=1 and the parameter PRE=0.

Step 9-12

Judge if the data having been last read-in went upward beyond threshold "c". If the judgment is yes, go to Step 9-13, but if the judgment is no, go to A of FIG. 13.

Step 9-13

Check if the parameter EM has been set as 1. If the judgment is yes, send the command for generating an emergency call to the signal generating device, and then go to A of FIG. 13, but if the judgment is no, go to A of FIG. 13.

Embodiment 5

FIG. 1 is a schematic illustration of this embodiment of a brain function signal input device according to the present invention.

In FIG. 1, reference numeral 1-1 denotes a light source made of a semiconductor laser element, for example, for emitting near-infrared rays having wavelengths in the vicinity of 800 nm, reference numeral 1-2 denotes a light source driver for driving the light source 1-1, reference numeral 1-3 is a power supply for the light source 1-1, reference numeral 1-4 is an oscillator for oscillating a signal for modulating the intensity of the near-infrared rays emitted from the light source 1-1.

The light from the light source 1-1 is intensity-modulated by the modulating signals from the oscillator 1-4, and is guided to the head 1-5 of the operator of this brain function signal input device by a light guide 1-7 made of an optical fiber, for example. Reference numeral 1-6 denotes a probe for projecting the near-infrared rays onto the head 1-5. The near-infrared rays guided to the head 1-5 is projected into the cerebrum through the scalp of the operator.

The human brain has various kinds of functions, and the respective functions are handled by different areas in the brain A distribution of functions in the brain is well-known as Brodmann Brain Mapping. Consequently a specific brain function to be used for controlling of equipment can be selected by selecting a specific position in the head to be illuminated by the laser light.

The near-infrared rays are projected onto an area in the brain where a brain function intended to be used is located in the brain. The near-infrared rays projected into the brain pass through the scalp, the skull and the brain, repeating scattering of the rays, and go out of the scalp.

FIG. 11 illustrates scattering and transmission of the laser light 111 projected onto the head from the optical fiber 110. The near-infrared rays 111 projected onto the scalp 112 pass through the scalp 112, the skull 113 while they are scattered and reflected repeatedly, and then they reach the cerebrum 114. The near-infrared rays 111 travel further into the cerebrum 114, and then some of them pass through the skull 113 and the scalp 112 and appear on the surface of the head. The near-infrared rays having come out of the head are sent to the photodetector via the optical fiber 115 for light detection. If the optical fiber 115 for light detection is positioned within 30 mm from the optical fiber 110 for projecting the laser light onto the head, the sufficient amount of the scattered and transmitted light is detected.

Blood is present in the brain for supplying nutrition and oxygen necessary for activity of the brain. Therefore the intensity of the laser light decays due to absorption by the blood as well as to scattering by the cerebrum tissue while the laser light passes through the cerebrum 114. Decaying by scattering of the laser light by the cerebrum tissue is substantially constant because no abrupt changes occur in the brain tissue morphology. The measured data disclosed in Japanese Patent Application Laid-Open Hei 9-149894 show that the amount of the blood in the cerebrum varies with activity of the cerebrum. This means the variations in intensity of the light having been scattered in and passed through the cerebrum reflect the activity of the cerebrum because the degree of absorption of the light varies with the amount of the blood varying in accordance with the activity of the brain. Therefore the activity of the cerebrum can be measured quantitatively by measuring the change in intensity of the light having passed through the cerebrum. Therefore the present invention uses the intensity change of the light having passed through the cerebrum as the signal corresponding to the activity of the cerebrum for controlling external equipment.

The near-infrared rays having passed through the brain and coming out of the scalp is guided to the light detector 1-9 by the light guide 1-8. The light detector 1-9 is comprised of a photodiode, an avalanche photodiode, a photomultiplier or the like. The light detector 1-9 converts the near-infrared rays supplied by the light guide 1-8 into electrical signals. The electrical signals are amplified by the amplifier 1-10, and are supplied to the lock-in amplifier 1-11.

The lock-in amplifier 1-11 detects the electrical signals modulated by the modulating frequency from the oscillator 1-4. The output of the lock-in amplifier 1-11 is converted into digital signals by the A/D converter 1-12, and is supplied to the data processor 1-13. The data processor 1-13 is coupled with the data input means 1-14 and the memory 1-15.

The data input means 1-14 is used for inputting data into the data processor 1-13, and the memory 1-15 is used for storing data processed in the data processor 1-13 and calculated results. The data processor 1-13 obtains the intensity of the brain function signal from the measured data. The processing procedure in the data processor 1-13 will be described later.

The calculated intensity of the brain function signals is supplied to the display device 1-16 and the changes of the intensity of the brain function signals are displayed on the screen of the display device 1-16. The changes of the intensity of the brain function signals are visually checked by the operator of this device.

The data processor 1-13 calculates the intensity of the brain function signals, then makes a decision over the brain function signal intensity and its change based upon the criterion having been stored in advance in the memory 1-15 via the data processor 1-13, and generates a control signal for controlling the external equipment.

The control signal from the data processor 1-13 is sent to the equipment control signal generator 1-17. The equipment control signal generator 1-17 generates the specific equipment control signal for controlling the external equipment based upon the control signal from the data processor 1-13 and sends the equipment control signal to the equipment 1-18a, the equipment 1-18b and the equipment 1-18c, so as to switch them on or off, or to set parameters in the equipment.

The data processing procedure by the data processor 1-13 will be explained by referring to a flow chart shown in FIG. 3.

In Step 3-1 in FIG. 3, the output of the lock-in amplifier 1-11 having been converted into digital signals by the A/D converter 1-12 is read into the data processor 1-13. In this embodiment the data are read in at an interval of 0.1 seconds. This data is on the intensity of the near-infrared rays having passed through the brain, and one example of this data is shown in FIG. 5, the abscissa representing time and the ordinate representing the intensity of the signals.

The data shown in FIG. 5 are data measured on brain function signals produced in the so-called motor area of the brain when an operator of this device when he repeated closing a hand and opening the hand alternately. This data clearly show signals of large-amplitudes corresponding to movements of the hand and signals of small-amplitudes corresponding to heartbeats are superposed on signals decaying slowly from the start of measurement.

The signals of large amplitudes also include signals caused by the change of the body temperature and signals supposed to be caused by autonomic nerves for unknown causes.

In Step 3-2 in FIG. 3, for the purpose of eliminating the signals caused by the heartbeats, but not reflecting the intention of the operator, the average of latest ten signals is calculated every time a new signal is read in. By this averaging, the signal components corresponding to the heartbeats are eliminated.

By choosing the number of read-in signals for one averaging to be more than the number of the signals read-in within the period of the heartbeats, the influences by the heartbeats can be effectively eliminated.

Suppose the heart beats 80 times per minute, then the number of signals read in within 0.75 seconds, a period of the heartbeats, is 8. In this embodiment, the averaging is calculated over ten signals to eliminate the influences by the heartbeats more effectively. FIG. 6 shows the data of the brain function signals obtained by the above averaging.

The influences by the heartbeats are absent in the curve shown in FIG. 6, but the slowly decaying signal components still remain. The next step 3-3 eliminates this signal components.

In Step 3-3 in FIG. 3, by using the averaged signals calculated in Step 3-2, a subtraction of the latest averaged signal from the averaged signal a predetermined time earlier is formed. If the brain function is activated, the amount of blood in the brain increases and the transmission of the near-infrared rays through the brain is decreased. Therefore the subtracted signals calculated in Step 3-3 become positive when the brain function is activated, and the subtracted signals become negative when the brain function is calmed. In this embodiment, a subtraction of the latest averaged signal from the averaged signal four seconds earlier is performed. The results obtained by this subtraction processing are shown in FIG. 7.

The slowly decaying signal components are absent in the curve in FIG. 7, and the peaks P1 and P2 corresponding to the brain function activity remain and are pronounced.

In Step 3-4 in FIG. 3, the curve of the brain function signals obtained by the subtraction processing in Step 3-3 is shown on the display screen of the display device 1-16.

In Step 3-5 in FIG. 3, the control signal for equipment control is generated based upon the brain function signals. The procedure for generating equipment control signals will be explained in detail, and is briefly explained here.

For generating equipment control signal, a reset level, a pre-engagement level and a control signal generating level are set in the intensity of the brain function signals, and the control signal is generated based upon the comparison of the brain function signals with the three levels.

If a brain function signal is lower than the pre-engagement level and then becomes higher than the pre-engagement level, the pre-engagement state for the control signal generation is established.

If, following the pre-engagement state, the brain function signal becomes higher than the control signal generating level, the control signal is generated.

The pre-engagement state is canceled if the control signal is generated, or if the brain function signal becomes lower than the reset level.

Assume that, in FIG. 7, the signal intensities (−2), 4 and 6 are the reset level, the pre-engagement level and the control signal generating level, respectively.

When the brain function signal is at the peak P1, it has became higher than the pre-engagement level 4, the pre-engagement state for the control signal generation is established, but the brain function signal is still lower than the control signal generating level 6, so the equipment control signal is generated. After this, the brain function signal became lower than the reset level (−2) and the pre-engagement state was canceled.

In the case of FIG. 7, the pre-engagement state for generating a control signal was canceled about 30 seconds after the establishment of the pre-engagement state by the peak P1, but the structure of this embodiment can be configured such that, if a control signal is not generated within a predetermined time from the establishment of the pre-engagement state, the pre-engagement state is canceled.

When the brain function signal is at the peak P2, it became higher than the pre-engagement level 4 and the pre-engagement state was established, and following this, the brain function signal became higher than the control signal generating level 6 and consequently the control signal was generated. In this case the pre-engagement state is canceled at the same time the control signal is generated.

The display device 1-16 will be explained. FIG. 10 illustrates an example of the display screen of the display device 1-16. Reference numeral 100 denotes a bezel. FIG. 10 illustrates a screen display for changing the channel of the TV receiver set by brain function signals. Reference numeral 101 is a rectangular pattern for indicating the intensity of light having passed through the brain, reference numerals 102, 103 and 104 are lines indicating thresholds for subdividing the signal intensity region. Reference numeral 105, 106 and 107 are lamps such as LEDs for indicating a history of the signal intensity changes. As described later, these lamps are switched on or off in accordance with setting of the parameters representing the controlled state of the equipment. Reference numeral 108 is a section for indicating the TV channel being selected, and reference numeral 109 is a release switch for initializing the display or the state of control.

The signal for controlling the equipment is generated if the history of the changes of the intensity of brain function signals satisfies a predetermined condition.

First, as a preparation for judging a history of the changes of brain function signals, brain function signals s are divided into four band regions by establishing three thresholds a, b and c, as shown in FIG. 12.

A signal intensity area where $a \geq s$ is referred to as Section A, a signal intensity area where $b \geq s > a$ is referred to as Section B, a signal intensity area where $c \geq s >$ is referred to as Section C, and a signal intensity area where $s > C$ is referred to as Section D.

The rules for controlling equipment in this embodiment are as follows:

(a) The control signal is generated only when the brain function signal increases from Section B to Section C, and then from Section C to Section D in succession. The first control signal is referred to as "control start signal", and the second and later control signals are referred to as "equipment control signals".

(b) The parameters in this embodiment are reset when the brain function signal decreases from Section B to Section A.

Judgment based upon the above rules is performed by the data processor 1-13. For data processing, a parameter PRE for pre-engagement of changing the channel and a parameter CH for changing the channel are set in the data processor. Each parameter can take 0 and 1 alternately, when the intensity of brain function signals changes.

A history of the intensity changes of the brain function signals is judged by a combination of these two parameters to decide if the conditions for generating the control signal are satisfied.

The rules for determination of the two parameters will be explained by reference to FIG. 12.

First the initial pre-engagement parameter PRE is set as 0.

The pre-engagement parameter PRE is set as 1 if the intensity S of brain function signals changes from Section C to Section D. The pre-engagement parameter PRE is always set as 1 except that the pre-engagement parameter PRE is set as 0 when the intensity S of brain function signals changes from Section B to Section A.

The initial channel changing parameter CH is set as 0. The channel changing parameter CH is set as 1 if the intensity S of brain function signals changes from Section B to Section C. The channel changing parameter CH is set as 0 if the intensity S of brain function signals changes from Section C to Section D, or if the intensity S of brain function signals changes from Section B to Section A.

When both the pre-engagement parameter PRE and the channel changing parameter CH have been set as 1, if the intensity s of the brain function signal changes from Section C to Section D, the control device 1-13 sends the command for generating the channel changing signal to the control signal generating device 1-17, and then the channel changing signal is generated.

The control procedure will be explained by reference to the flowcharts of FIGS. 13 and 14. The control procedure is divided into a main flow for control in FIG. 13 and a judgment flow for generating the control signal in FIG. 14.

First a main flow for control will be explained in connection with FIG. 13. By switching on the control device, Step 5-1 is started. The constituent devices are switched on by starting Step 5-1. Then projection of the laser light onto the head is started for measuring the brain function. Each step will be explained below.

Step 5-2

Input the parameters for setting the operation of the control device, the parameters a, b and c used for subdividing the intensity area of brain function signals, for example. Inputting data is carried out at the input device or by reading out data stored in the memory device. Set the initial parameters PRE and CH as 0 in the data processor 1-13.

Step 5-3

Read in the measured intensity of the laser light having passed through the head. Perform the averaging and subtraction processing on the data. The first Step 5-3 reads data the required number of times for the averaging and subtraction processing on the data, but the second and later Step 5-3 reads data once.

Step 5-4

Display the read-in laser light intensity on the display device.

Step 5-5

Next display the controlled state of the external equipment. After first reading-in data, the controlled state of the equipment is the state as initially set, and after second and later reading-in data, the controlled state of the equipment is based upon the read-in data.

Step 5-6

Check if there is a "stop command." If the stop command is present, discontinue the operation of the control device. If the stop command is absent, perform a judgment based upon read-in data as shown in FIG. 14, and generate a control signal based upon the result of the judgment. After completing this processing, return to Step 5-3 and read-in next data repeat each step to Step 5-6 successively.

The judgment flow will be explained in connection with FIG. 14.

Step 6-1

Judge if the data having been last read-in went downward beyond the threshold "a". If the previous data was in Section B and the present data is in Section A, this means the data went downward beyond "a". If the data went downward beyond "a", go to Step 6-2, but if the data did not go downward beyond "a", go to Step 6-3.

Step 6-2

Set the parameters PRE and CH as 0, and then go to the control flow Step 5-3 of FIG. 13.

Step 6-3

Judge if the data having been last read-in went upward beyond the threshold "b". If the judgment is yes, go to Step 6-4, but if the judgment is no, go to Step 6-5.

Step 6-4

After setting the parameter CH=1, go to the control flow Step 5-3 of FIG. 13.

Step 6-5

Judge if the data having been last read-in went upward beyond the threshold "c". If the judgment is yes, go to Step 6-6, but if the judgment is no, go to the control flow Step 5-3 of FIG. 13.

Step 6-6

Judge if the parameter PRE has been set as 1. If the judgment is yes, go to Step 6-7, but if the judgment is no, go to step 6-8.

Step 6-7

Judge if the parameter CH has been set as 1. If the judgment is yes, go to Step 6-9, but if the judgment is no, go to the control flow Step 5-3 of FIG. 13.

Step 6-8

After setting the parameter PRE=1 and the parameter CH=0, go to the control flow Step 5-3 of FIG. 13.

Step 6-9

Send the command for generating the signal for changing the channel to the signal generating device, set the parameter CH=0, and then go to the control flow Step 5-3 of FIG. 13.

A simple method of generating a control signal is to generate a control signal in accordance with brain function signals. But the brain function signals sometimes change due to unexpected noise although data processing for eliminating the influences by autonomous variations of a living body or movement of the body are performed on the measured brain function signals.

To avoid errors in control caused by such changes, in this embodiment, three thresholds are established in the intensity of the brain function signals, and the generation of the control signal is performed only when the changes crossing the threshold occur.

In this case, if a difference between the adjacent thresholds is selected to be larger than fluctuations of respective brain function signals or noise, the errors due to the fluctuations or noise in equipment control are avoided.

As explained above, the embodiments of the present make possible a function for controlling equipment by using the brain function signals, an example of signals from a living body. This function provides disable people with useful means.

The present invention provides the easily-obtainable and reliable control signal for judgment because of its higher signal-to-noise resulting from the variations of the amount of blood in a living body compared with the weak signals obtainable from brain waves.

According to the present invention, the operator of the brain function signal input device can operate the device while he watches the brain function signals, the control signal generating region, and the state of the generated control signal. Consequently the present invention provides the ease of operation of equipment, prevents inappropriate operation of equipment and enables accurate operation.

What is claimed is:

1. A device for controlling equipment by a signal from a living body comprising:
   at least one projector adapted to project light onto a living body,
   a light detector for detecting an intensity of the light having passed through the living body from said at least one light projector,
   a data processing section provided with at least three threshold values predetermined for signals corresponding to the intensity of the light from said light detector and set to store a history of changes of the signals defined by an event in which a signal from said light detector crosses two adjacent ones of said at least three threshold values in succession, and a control signal generating section for generating an equipment control signal when the changes of the signals match a specified sequence of changes of the signals.

2. A device for controlling equipment by a signal from a living body according to claim 1, wherein said at least three threshold values are spaced from each other by a value greater than a maximum noise level anticipated.

3. A device for controlling equipment by a signal from a living body comprising:

a plurality of light projectors adapted to project light onto a head of a living body, a plurality of light detectors for detecting intensity of the lights having passed through the head of the living body from said plurality of light projectors, a data processing section provided with a plurality of predetermined signal levels for signals from said plurality of light detectors corresponding to the intensity of the light, said data processing section being pre-engaged to generate an equipment control signal if a signal from said plurality of light detectors exceeds a first one of said plurality of predetermined signal levels, and then said data processing section generating the equipment control signal if the signal from said plurality of light detectors goes below the first one of said plurality of predetermined signal levels, and an equipment control section for controlling external equipment in response to the equipment control signal from said data processing section.

4. A device for controlling equipment by a signal from a living body according to claim 3, wherein said data processing section is pre-engaged to generate the equipment control signal when the signal from said plurality of light detectors exceeds the first one of said plurality of predetermined signal levels, said data processing section then cancels the pre-engagement of generation of the equipment control signal if the signal from said plurality of light detectors exceeds a second one of said plurality of predetermined signal levels.

* * * * *